(12) United States Patent
Pchelnikov et al.

(10) Patent No.: US 7,583,090 B2
(45) Date of Patent: Sep. 1, 2009

(54) ELECTROMAGNETIC APPARATUS FOR MEASURING ANGULAR POSITION

(75) Inventors: Yuriy Nikitich Pchelnikov, Cary, NC (US); David Scott Nyce, Apex, NC (US)

(73) Assignee: David S. Nyce, Apex, NC (US)

( * ) Notice: Subject to any disclaimer, the term of this patent is extended or adjusted under 35 U.S.C. 154(b) by 31 days.

(21) Appl. No.: 11/512,626

(22) Filed: Aug. 30, 2006

(65) Prior Publication Data
US 2008/0054911 A1 Mar. 6, 2008

(51) Int. Cl.
*G01R 29/12* (2006.01)
*G01P 15/00* (2006.01)

(52) U.S. Cl. ............... 324/635; 324/633; 324/167; 324/457

(58) Field of Classification Search ............... 324/635, 324/167, 633
See application file for complete search history.

(56) References Cited

U.S. PATENT DOCUMENTS

| | | | |
|---|---|---|---|
| 6,208,134 B1 * | 3/2001 | Demma | 324/207.26 |
| 6,393,912 B2 * | 5/2002 | Pchelnikov et al. | 73/488 |
| 6,522,128 B1 * | 2/2003 | Ely et al. | 324/207.17 |
| 6,534,970 B1 * | 3/2003 | Ely et al. | 324/207.17 |
| 6,586,949 B1 * | 7/2003 | Sargent et al. | 324/690 |
| 2002/0075006 A1 * | 6/2002 | Goldfine et al. | 324/457 |
| 2003/0020450 A1 * | 1/2003 | Neumann et al. | 324/76.49 |
| 2004/0051539 A1 * | 3/2004 | Burdess et al. | 324/633 |

* cited by examiner

*Primary Examiner*—Vincent Q Nguyen
*Assistant Examiner*—John Zhu

(57) ABSTRACT

An apparatus is disclosed for measuring a variable angular position of a movable part. The apparatus comprises at least two resonators formed by coupled slow-wave structures, and at least two movable targets having electrodynamic profiles, the targets also having a variable angular position. The angular position of the target is representative of the angular position of the movable part. An electromagnetic field is excited in the resonators at a frequency at which electromagnetic parameters of the resonators depend upon the position of the targets. A change in the angular position of the targets therefore causes a change in electrodynamic parameters of the resonators. The change in the electrodynamic parameters of the resonators is converted into a reading, such as an output voltage, which is indicative of the measured angular position.

17 Claims, 5 Drawing Sheets

ELECTROMAGNETIC APPARATUS FOR MEASURING ANGULAR POSITION

BACKGROUND OF THE INVENTION

1. Field of the Invention

The present invention relates to angular position measurement, more specifically, to an electromagnetic method and apparatus for measuring angular position, rotational speed, or displacement, of a movable target.

2. Description of the Prior Art

The usefulness of the application of an RF or microwave field for the measurement of angular position is recognized by the prior art. Such devices can operate with either RF or microwave excitation. When an electromagnetic field is excited near the rotating part of this type of device, the parameters of the electromagnetic field, such as resonant frequency, phase, or amplitude, vary with a change of angular position of the rotating part. The electromagnetic field parameters may be converted into a desired type of indication, including angle, angular displacement, angular speed, rotation frequency, and so on. In particular, such art is exemplified in U.S. Pat. No. 3,939,406 "Sensing Rotational Speed by Amplitude Modulating a Continuous Microwave Signal," /F. W. Chapman, F. E. Jamerson, and N. L. Muench, 1971, disclosing an electrodynamic sensor including two cavity resonators, one connected to a microwave generator, the other connected to a microwave receiver, the two cavity resonators are placed near a muff installed on the rotating part, the muff has identical slots in a cylindrical surface along a generatrix, and positioned periodically in the angular direction. The rotation of the slots is influenced by the angular position of the muff, and leads to a change in the electromagnetic connection between the resonators and, as a result, to the amplitude modulation of the signal passing from the microwave generator to the receiver. The modulation frequency is proportional to rotational speed.

A general discussion, see V. A. Viktorov, B. V. Lunkin and A. S. Sovlukov, "Radio-Wave measurements" [in Russian], Moscow: Energoatomizdat, 1989, pp. 148-153, states that a microwave resonator is placed near the rotating part, of which a surface electrodynamic property (the "electrodynamic profile") changes in the azimuth direction, and the resonator's frequency has a direct correlation to the angular position of the rotating part.

Slowed electromagnetic waves and slow-wave structures are also well known in the field of microwave engineering, see J. R. Pierce, "Traveling-Wave Tubes" D. Van Nostrand Company, Inc., Princeton, N.J., 1950. These waves are electromagnetic waves propagating in one direction with a phase velocity $v_p$ that is smaller than the velocity of light c in vacuum. The relation $c/v_p$ is called slowing or deceleration, and is designated as N, or the slowing factor. In most practical applications, slowed electromagnetic waves are formed in slow-wave structures by coiling one or two conductors, for example, into a helix, or radial spiral (prior art), which increases the path length traveled by the wave. The coiled conductor is called the "impedance conductor," the other is called a "screen conductor." Additional deceleration was also obtained due to positive electric and magnetic coupling in coupled slow-wave structures, in which both conductors are coiled and have the configuration of mirror images turned by 180° relative to the plane of symmetry, see Yu. N. Pchelnikov, "Comparative Evaluation of the Attenuation in Microwave Elements Based on a Spiral Slow-Wave System," Soviet Journal of Communication Technology and Electronics, Vol 32, #11, 1987, pp. 74-78.

Slow-wave structure-based sensing elements are known in the art, see V. V. Annenkov, Yu. N. Pchelnikov "Sensitive Elements Based on Slow-Wave Structures" Measurement Techniques, Vol. 38, #12, 1995, pp. 1369-1375. The slowing of the electromagnetic wave leads to a reduction in the resonant dimensions of the sensing elements and this enables one, by using the advantages of electrodynamic structures, to operate such a device at relatively low frequencies for a given size of sensing element. Lower frequencies are more convenient for generation and are more convenient for primary conversion of the information signal, but must be sufficiently high to provide high accuracy and high speed of response. The low electromagnetic losses at relatively low frequencies (a few to tens of megahertz) also helps to increase the accuracy and sensitivity of the measurements. The slowing of the electromagnetic wave also leads to energy concentration in the transverse and longitudinal directions, that results in an increase in sensitivity, proportional to the slowing factor N, see Yu. N. Pchelnikov, "Nontraditional Application of Surface Electromagnetic Waves" Abstract Book, First World Congress on Microwave Processing, 1997, pp. 152-153.

Prior Art in the same field as the present invention includes "Electromagnetic Method of the Angular Displacement Monitoring" using sensing elements based on slow-wave structures and a moving target with a changing electrodynamic profile (U.S. Pat. No. 6,393,912 B2, Yu. N. Pchelnikov and D. S. Nyce). A rotary position sensing method based on slow-wave structures is taught in this patent. The present invention, however, teaches a different and novel apparatus forming an angular position sensor with improved measurement capability and performance.

Both the prior art and the present invention measure one or more parameters of an electromagnetic field. Some of the prior art methods and the present invention use two or more stationary elements, placed near a rotating part, having an "electrodynamic profile." The stationary elements are connected to a measuring circuit comprising an RF or microwave signal generator which is used to excite an electromagnetic field. A change in position of the rotating part causes a shift in the characteristics of the electromagnetic field in the stationary elements. See V. A. Viktorov, B. V. Lunkin and A. S. Sovlukov, "Radio-Wave measurements" [in Russian], Moscow: Energoatomizdat, 1989, pp. 148-153.

Devices according to the prior art exhibit several problems which are overcome by the present invention. Some of the previous methods have low accuracy, sensitivity, and resolution at relatively low frequency, increasing only with an increase in frequency. However, the increase in frequency is accompanied by an increase in electromagnetic losses, such losses causing a loss of accuracy of the measurement. It is also known that the higher the frequency is, the higher the cost of electronics. Apparatus according to the prior art are relatively complex and require a complex set of electronics to convert the informative parameter into a usable reading. Thus, there is a need in the art for improving apparatus for measuring angular position, and related values, with lower cost, having good sensitivity, and high resolution.

BRIEF SUMMARY OF THE INVENTION

The present invention employs at least two resonators formed by counter-wound radial spirals, electrodynamic parameters of the resonators being informative parameters of position, rotation velocity, and the like. These resonators are excited in the opposite-phase mode and are sensitive to a target having electrical conductivity in the direction of the windings. The main advantages of apparatus according to the present invention, in comparison to prior art, are: very large sensitivity to the rotation of the target and simplicity of converting the informative parameter into a position reading.

An increase in sensitivity is achieved due to the concentration of electromagnetic energy near the rotating surface, and due to splitting of the electric and magnetic fields: the electric field is concentrated between the conductors of the slow-wave structures that form each resonator, and the magnetic field is disposed in the region between the resonator and the target. An additional increase in sensitivity is caused by a comparison of the impedances of the resonators (a differential measurement). The direction of rotation is sensed by using a non-symmetrical electrodynamic target. A simple and inexpensive circuit can be constructed using a bridge circuit with rectifying shoulders. The high accuracy and resolution are due to the resonators' design: the slow-wave structure-based resonators of preferred embodiments of the present invention are disposed on a temperature-stable dielectric base, contrary to, for example, cavity resonators.

The present invention teaches an electromagnetic method for measuring angular position, direction of rotation, rotation speed, or other measurements that require high resolution, wherein: an excited electromagnetic wave with electric energy concentrated between conductors of the resonator and magnetic energy disposed outside of the resonator makes it possible to increase the sensitivity and accuracy of measurement, using a relatively simple and inexpensive sensor design. The design is implemented in an apparatus, for example, a rotary encoder, wherein: the structural form of the resonators, used as the sensing elements, and the electrodynamic target mounted on the rotating part, allow increased sensitivity and accuracy, as compared with the methods of prior art.

It is known that parameters (e.g. propagation velocity) of an electrically conductive material change when placed in an electromagnetic field. This can lead to a phase delay or a change in resonant frequency. The influence of nearby dielectric, conducting, and magnetic materials differs and depends on the distribution of electric and magnetic fields in the measured volume, see V. A. Viktorov, B. V. Lunkin and A. S. Sovlukov, "Radio-Wave measurements" [in Russian], Moscow: Energoatomizdat, 1989, pp. 148-153. The application of coupled slow-wave structures makes it possible to split the electric and magnetic fields in the transverse direction. In the case of resonators based on coupled slow-wave structures, such a "split field" is very sensitive to an electrically conductive target. The current excited in the target decreases the magnetic field intensity which, in turn, leads to an increase in the resonant frequency and a decrease in the resonator's impedance.

BRIEF DESCRIPTION OF THE DRAWINGS

For further understanding of the nature and objects of the present invention, reference is made to the following figures in which like parts are given like reference numerals and wherein.

DETAILED DESCRIPTION OF THE INVENTION

Figure 1:
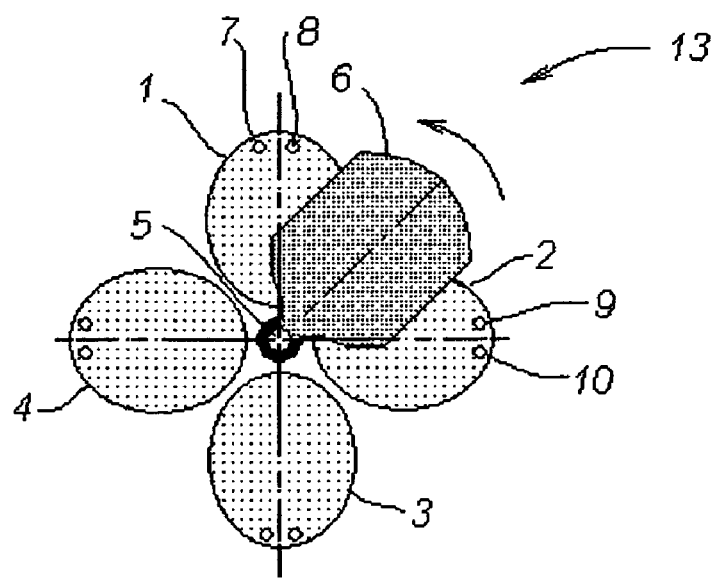
FIG. 1 illustrates a general schematic of the sensing element resonators and target(s) being used in an apparatus for measurement of angular position according the present invention.

A general schematic of the present invention is shown in FIG. 1. Here, resonators 1, 2, 3, and 4 are placed in one plane (parallel to the rotation plane) perpendicular to a rotation axis, rotating rod 5. The number of resonators should exceed one. Electrodynamic target 6 connected to rotating rod 5 is installed in a rotation plane, having the capability of being rotated, and positioned parallel to the plane of the resonators. Its configuration is non-symmetrical with respect to the rotation axis. In all versions of the present invention, electrodynamic target 6 or an additional target positioned on the other side of resonators 1, 2, 3, and 4, should exhibit good electrical conductivity. It can be a metal plate or metallization on a dielectric plate, for example. Terminals of all resonators, e.g. terminals 7 and 8 of resonator 1 and terminals 9 and 10 of resonator 2, are connected to RF oscillator 11 and measuring circuit 12, shown later. All resonators mentioned above are formed by coupled slow-wave structures, and placed parallel to the rotation plane approximately symmetrically, forming sensing element 13. Coupled slow-wave structures, by definition (see Yu. N. Pchelnikov and D. S. Nyce, "Slow-Wave Structures-Based Method of Measurements," IEEE Transactions on Instrumentation and Measurements, Vol. 51, # 5, October 2002, pp. 891-896), are formed by two impedance conductors rotated by 180° with respect to one another (mirror images of one another).

Figure 2:
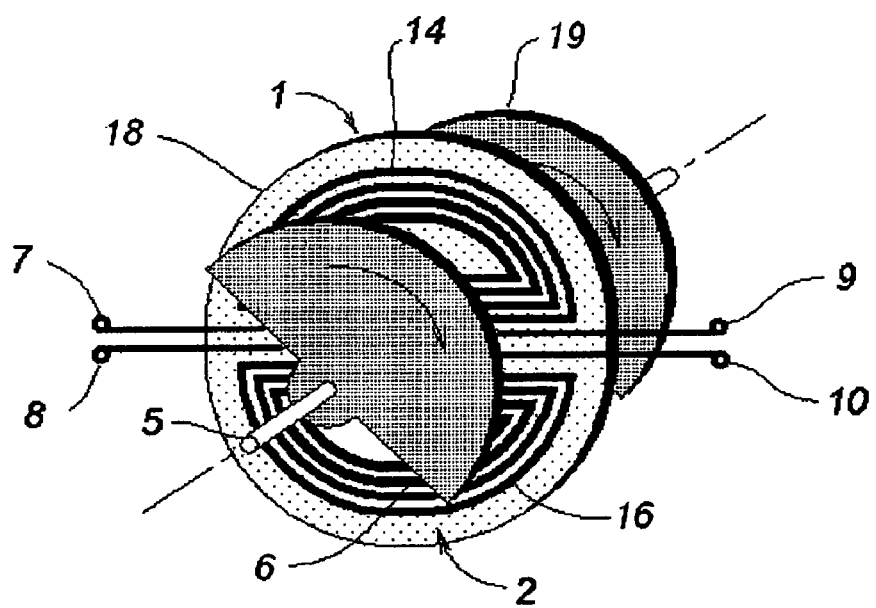
FIG. 2 illustrates a preferred embodiment of the present invention in which two approximately identical resonators are placed symmetrically in the same plane and are installed between two moving targets.
Figure 3:
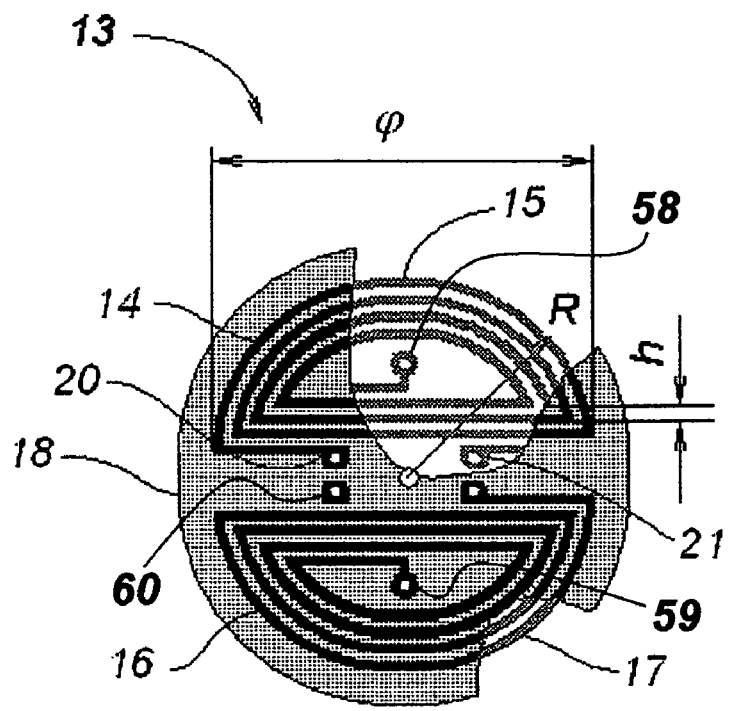
FIG. 3 illustrates a design of resonators according to a preferred embodiment of the present invention.

FIGS. 2 and 3 show a preferred embodiment of the present invention. Here, two approximately identical resonators 1 and 2, are formed by coupled spirals 14, 15 and 16, 17 manufactured as a metallization on opposite sides of dielectric disc 18, Pitch h of spirals according to the present invention can be constant or varying. Resonators 1, 2 are installed approximately symmetrically at approximately equal distances between two rotating targets 6 and 19, fastened to rod 5 connected to a rotating part (not shown in the figures). d (shown in FIG. 10) is the distance from target 6 and target 19 to the plane of symmetry (the plane of the resonators). Using two electrodynamic targets 6, 19 doubles the sensitivity of measurements, and decreases error caused by a change in the distance d. Spacing between spirals 14 and 15 as well as between spirals 16, 17 (e.g. the thickness of the dielectric disc 18 in FIGS. 2, 3) should be less than distance d.

Coupled spirals 14, 15 and 16, 17, as shown in FIG. 3, have approximately identical half-circle configuration and approximately the same pitch h. The difference between the spirals is in the opposite directions of winding. The angular width φ of resonators 1 and 2 (shown in FIG. 3 as coupled spirals 14, 15 and 16, 17) is approximately equal to π radians, or 180°. The spirals are deposited one opposite the other on opposite sides of dielectric plate 18. In a preferred embodiment of the present invention, pitch h is constant. Resonators 1 and 2 are connected through terminals 7, 8 and 9, 10 (also shown in FIG. 2) to a measuring circuit 12, shown later.

The external radius of the circle formed by the spirals is designated as R in FIG. 3.

In a preferred embodiment of the present invention, the internal ends of the spirals forming each resonator are connected (shorted) to one another. In FIG. 3, spiral 14 starts at external end 20, and is disposed on the top surface of dielectric disc 18. Spiral 14 continues clockwise until reaching feedthrough 58, approximately in the center of spiral 14. Feedthrough 58 forms the internal end of spiral 14 on the top surface of dielectric disc 18, as well as the internal end of spiral 15 which is disposed on the bottom surface of dielectric 18. Spiral 15 continues in a counter-clockwise direction, as viewed from below, (but appears to be clockwise if viewed from above, through dielectric disc 18). As spiral 15 continues and spirals wider, it then forms external end 21, and may feedthrough also to the top surface of dielectric disc 18 in order to facilitate electrical connection thereto. External ends 20 and 21 of spirals 14 and 15 respectively, thus configuring resonator 1 as a quarter-wave resonator. In like fashion, spiral 16 starts with external end 60, travels counter-clockwise until reaching feedthrough 59 approximately in the center of spiral 16, with feedthrough 17 thus forming the internal end of spiral 16 on the top surface of dielectric disc 18, as well as the internal end spiral 17 on the bottom surface of dielectric disc 18. Spiral 17 then continues in a counter-clockwise direction (as viewed from the top) until terminating at external end 61, which may also be a feedthrough in order to facilitate electrical connection thereto. In other versions of the present invention, the internal ends of resonators 1, 2 can be open, each one (e.g. spirals 14 and 15) thereby forming a half-wavelength resonator.

Figure 4:
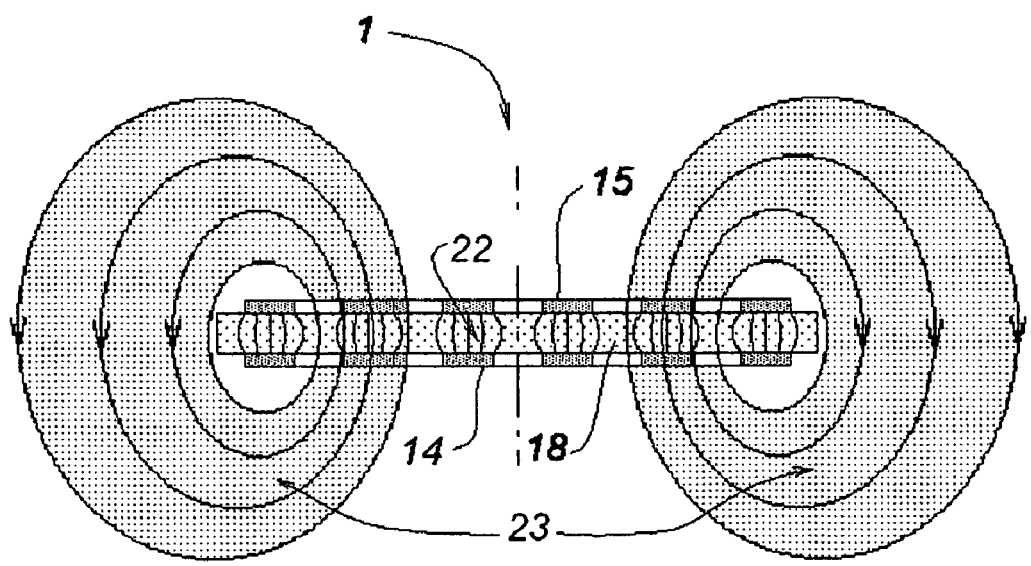
FIG. 4 shows electric and magnetic field distribution in a resonator according to the present invention.

With opposite-phase excitation, the electromagnetic field in such resonators, e.g. resonator 1, of which a cross section is shown in FIG. 4, splits its field so that the electrical field 22 is concentrated within disc 18, and the magnetic field 23 is disposed outside of spirals 14, 15. This makes such resonators very sensitive to metal targets 6, 19. Azimuth components of the currents in each pair of spirals, e.g. 14, 15, as well as in spirals 16, 17 have the same direction. This leads to a significant increase in the total magnetic field. Currents excited on the conducting surfaces of targets 6 and 19 have an opposite direction as compared to the currents in resonators 1 and 2. This leads to a decrease in equivalent inductance $L_1$ or $L_2$ of the resonator opposing the target(s).

The effect of the equivalent inductance dependence on the position of targets 6 and 19 is used in the electromagnetic apparatus for measuring angular position according to the present invention. Assuming for simplicity that targets 6 and 19 practically do not change the equivalent capacitances $C_1$ and $C_2$ of resonators 1 and 2, while equivalent inductances $L_1$ and $L_2$ of these resonators change their values from $L_{MAX}$ to $L_{MIN}$, one can write for minimum and maximum resonant frequencies of resonators 1 and 2

$$f_{MIN} = \frac{1}{2\pi\sqrt{L_{MAX}C_{1,2}}}, f_{MAX} = \frac{1}{2\pi\sqrt{L_{MIN}C_{1,2}}}. \quad (A)$$

Assuming also that targets 6 and 19 have the same angular width as each resonator, and the equivalent inductances decrease or increase proportionally to the rotation angle α, it's possible to solve for the resonant frequency of a resonator, e.g. resonator 1

$$f_1(\alpha) = f_{MIN} + (f_{MAX} - f_{MIN})\frac{\alpha}{\varphi}, \quad (B)$$

where φ is the angular width of resonator 1 and α=0 when the target(s) fully cover resonator 1.

In the version of the present invention considered above, comprising two resonators with angular width φ approximately equal to 180°, an increase in the resonator 1 resonant frequency $f_1$ is followed by a decrease in the resonator 2 resonant frequency $f_2$ $$f_2(\alpha) = f_{MAX} - (f_{MAX} - f_{MIN})\frac{\alpha}{\varphi}. \quad (C)$$

Figure 5:
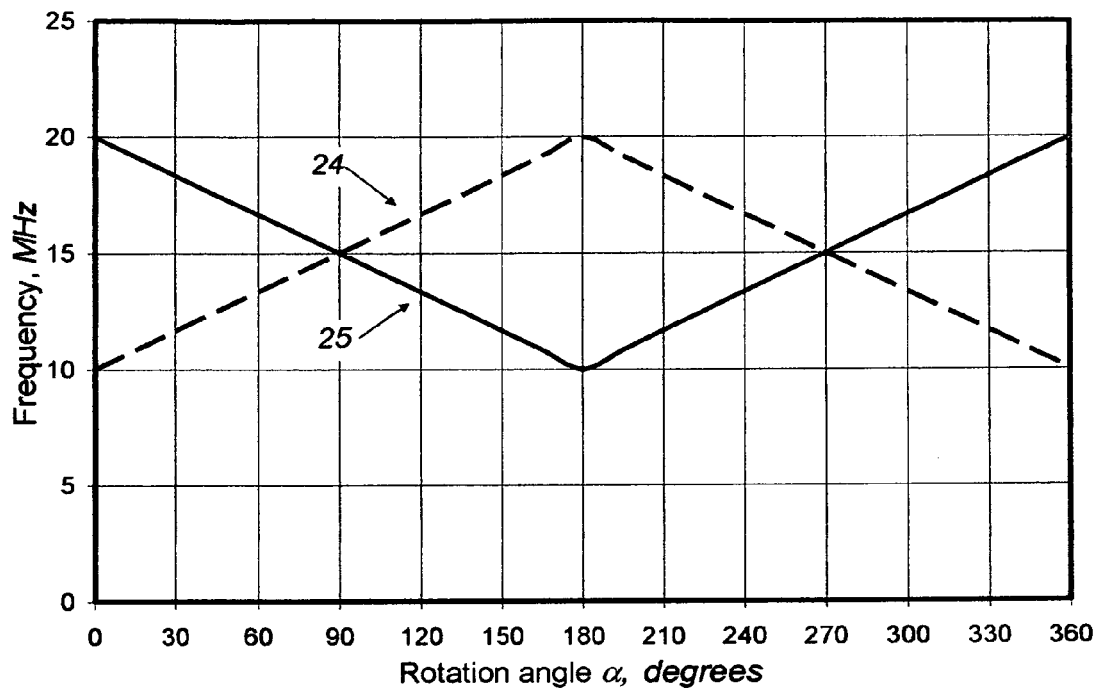
FIG. 5 illustrates an approximate dependence of the resonant frequencies of two symmetrically placed resonators upon the angular position of electrically conductive targets, according to the present invention.

Curves 24 and 25 in FIG. 5 show the relationship of frequencies $f_1$ and $f_2$ versus angle α calculated for $f_{MAX}$=20 MHz, $f_{MIN}$=10 MHz.

Figure 6:
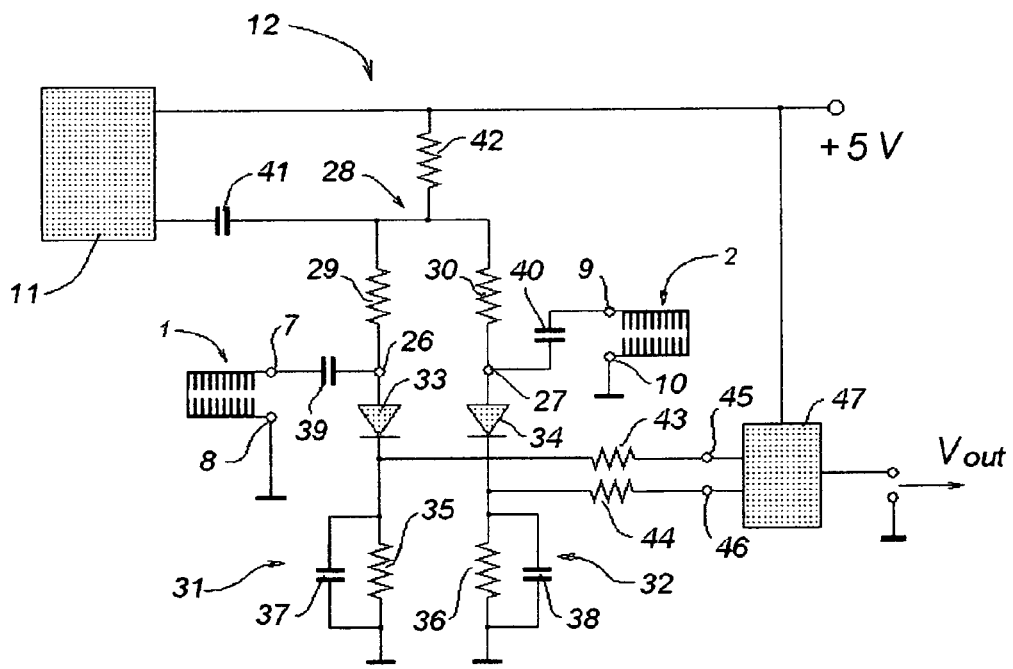
FIG. 6 illustrates a measuring circuit that converts impedances of the resonators into a reading of the position of at least one target, according to the present invention.

A change in the resonant frequencies is followed by a change in the impedances $Z_1$ and $Z_2$ on terminals 7, 8 and 9, 10, connected to measuring circuit 12 (FIG. 6). The change in impedances caused by rotation of targets 6 and 19, changes the potentials on terminals 26 and 27 on the shoulders of bridge 28 formed by resistors 29, 30 and rectifying branches 31, 32 formed by diodes 33, 34, resistors 35, 36 and capacitors 37, 38. To avoid a DC connection, resonators 1, 2 are connected to terminals 26, 27 through AC coupling capacitors 39, 40. The RF voltage that is generated by oscillator 11 is divided between the shoulders of bridge 28, the ratio of voltages depending on the ratio of impedances in the shoulders. Oscillator 11 and bridge 28 are AC coupled by capacitor 41. Resistor 42 allows the optimization of the operating currents of diodes 33, 34 in rectifying branches 31, 32. Rectified signals obtained on resistor 35 and capacitor 37 as well as on resistor 36 and capacitor 38 go through resistors 43 and 44 to terminals 45, 46 of differential amplifier 47, of which the output voltage $V_{out}$ can be used as a reading of the rotation angle.

According to the present invention, one conducting target may be used instead of two. The advantage of using two targets is that it provides two times the sensitivity, and reduces the error caused by a change in the distance d. The best results are achieved when angular width of the targets according to the present invention is equal to, or slightly greater than, angular width φ of the resonator. In preferred embodiments of the present invention, when two resonators are used, φ≈180°. It can be more or less, with less sensitivity. The targets' configuration can differ, but the best sensitivity is achieved when the area of the targets are large enough to cover the whole surface of one resonator without overlapping any of the surface of the other resonator. The targets can be manufactured from solid metal plate or can be deposited on a dielectric plate. The number of resonators can exceed two. In this case, measuring circuit 12 should be expanded to incorporate the additional signal(s), as needed.

Figure 7:
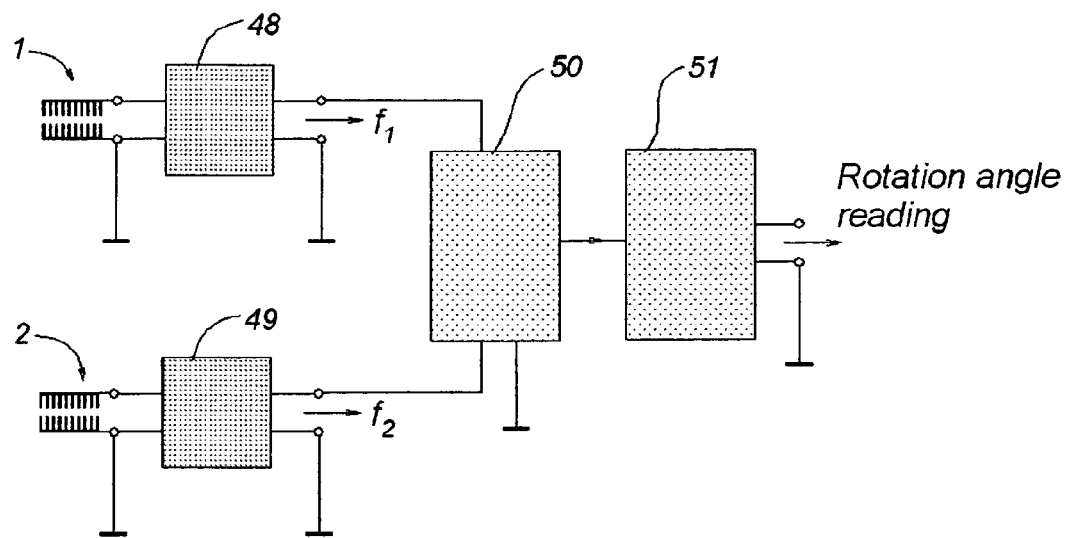
FIG. 7 illustrates a measuring circuit that converts frequency signals from two oscillators into a reading of the position of at least one target, according to the present invention.

Other measuring circuits and more oscillators can be used for measuring angular position and related parameters according to the present invention. For example, besides the circuit of FIG. 6, comparing input impedances of resonators 1 and 2, a circuit comparing frequencies $f_1$ and $f_2$ of oscillators 48, 49 can be also used according to the present invention (FIG. 7). Here, frequency $f_1$ of the RF signal generated by oscillator 48 and frequency $f_2$ from oscillator 49 depend on the resonant frequencies of resonators 1 and 2, respectively. After going through converter 50 (which can be a mixer, frequency to amplitude converter, or another device) these signals are conditioned into a desired reading by the signal conditioner 51. In this case, depending on the configuration of oscillators 48, 49, resonators 1, 2 can either be shorted or open ended.

Two or more informative signals may be obtained from two or more resonators of the apparatus according to the present invention. (e.g. resonant frequencies of the resonators forming sensing element 1 or their input impedances.) Comparing of these signals allows the angular position, velocity and the direction of rotation to be determined. The change in the input impedances can be converted into rectified signals, which amplitudes depend on the position of targets 6, 19. The rectifying and comparing of these signals can be accomplished, according to a version of the present invention, by the rectifying bridge 28, shown in FIG. 6.

The preferred configuration of resonators and targets according to a preferred version of the present invention is a segment (sector). This configuration provides better sensitivity due to better utilization of the area of sensing element 13.

Figure 8:
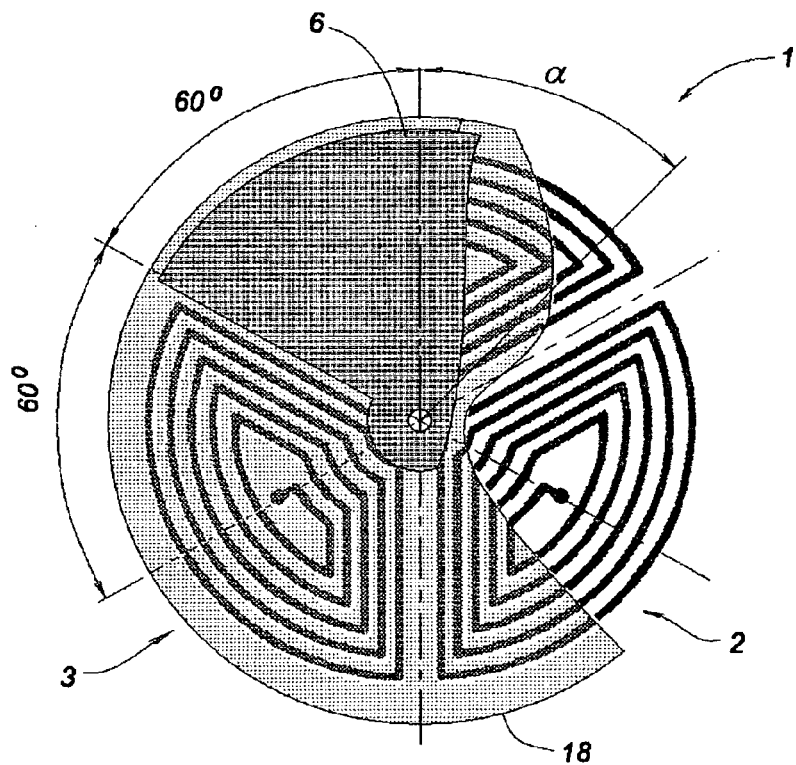
FIG. 8 illustrates a sensing element design having three resonators according to a preferred embodiment of the present invention.

In a preferred embodiment of the apparatus according to the present invention, three approximately identical resonators (1, 2, 3) with an angular width of approximately 120° are installed parallel to the rotation plane (FIG. 8). Targets 6, 19 also have an angular width of approximately 120°. Three informative signals, e.g. resonant frequencies $f_1$, $f_2$, and $f_3$ or impedances $Z_1$, $Z_2$, and $Z_3$ can be converted into rotation angle α.

Figure 9:
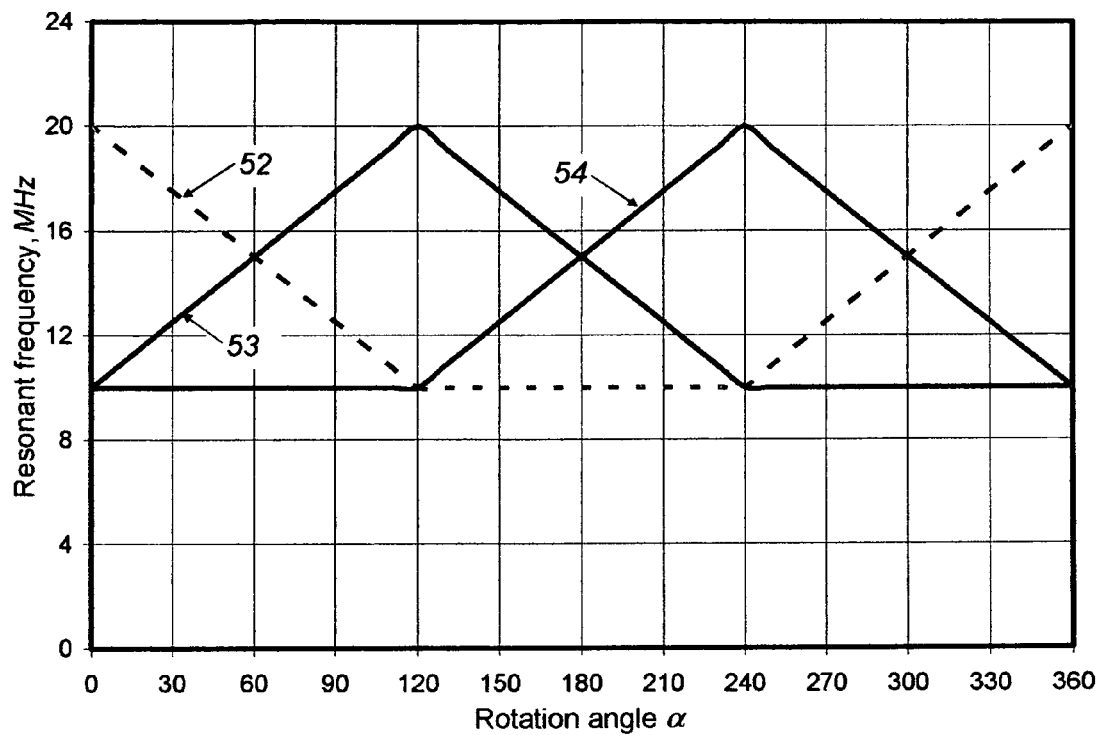
FIG. 9 illustrates an approximate dependence of the resonant frequencies of three symmetrically placed resonators upon the angular position of electrically conductive targets, according to the present invention.

Curves 52, 53, and 54 in FIG. 9 demonstrate approximate dependences of resonant frequencies $f_1$, $f_2$, and $f_3$ of resonators 1, 2, and 3 upon the angular position of the targets 6, 19 according to a three-resonator version of the present invention.

At a relatively low frequency, when the thickness a of disc 18 and distance d to targets 6 and 19 is much (hundreds of times) less than the wavelength of the electromagnetic wave in free space, equivalent capacitances $C_1$ and $C_2$ of resonators 1 and 2 are defined by the approximate formula:

$$C_1 \approx C_2 \approx \varepsilon_0 \frac{\pi R^2}{2} \frac{w}{h}\left(\frac{\varepsilon}{a}+\frac{2}{d}\right) = \varepsilon_0 w l\left(\frac{\varepsilon}{a}+\frac{2}{d}\right), \quad (D)$$

where R is the external radius of the circle, framing the spirals, $\varepsilon_0$ and $\varepsilon$ are the permittivity of free space and relative permittivity of the material of disc 18, w is the conductors' width (always less than pitch h), and l is the total length of one of the spiral conductors, e.g. the conductor of spiral 14. For the purpose of further explanation, it is assumed that the parameters of the coupled spirals parameters can be characterized by the spiral conductor length, l, and its pitch, h.

In the absence of targets 6 and 19, formula (D) becomes $$C_1 \approx C_2 \approx \varepsilon_0 \varepsilon \frac{w \pi R^2}{2 h a} = \varepsilon_0 \varepsilon \frac{w l}{a}. \quad (E)$$

Here and further it is taken into account that resonators 1 and 2 are formed by spirals with a half circle configuration, i.e. their equivalent capacitance and inductance are one-half that of a full-circle spiral.

Equivalent inductances $L_1$ and $L_2$ of coupled spirals, when placed at a small distance a from one another, exceed the inductance of one spiral in free space by approximately four times $$L_1 \approx L_2 \approx \mu_0 \frac{\pi R^2}{w h \tau} = \mu_0 \frac{2l}{w \tau}, \quad (F)$$

where τ is the transverse constant approximately proportional to deceleration N $$\tau \approx \frac{2\pi N}{\lambda}, \quad (G)$$

λ is the wavelength in free space and deceleration N is defined as the ratio of light velocity to the phase velocity of the wave in resonators 1 and 2.

When targets 6 and 19, are placed at a distance d from the plane of resonator 1 or resonator 2, and are aligned with the resonator, inductances decrease, approximately in proportion to distance d $$L_1 \approx L_2 \approx \mu_0 \frac{\pi R^2}{h} \frac{d}{2w} = \mu_0 l \frac{d}{w}, \quad (H)$$

while the increase in capacitances is much less than the decrease in inductances $$C_1' \approx C_2 \approx \varepsilon_0 w l\left(\frac{\varepsilon}{a}+\frac{1}{d}\right). \quad (I)$$

The expressions above allow the calculation of the minimum and maximum resonant frequencies $$f_{MIN} = \frac{1}{2\pi\sqrt{L_1 C_1}} = \frac{47.8 \cdot 10^6}{l\sqrt{\varepsilon}}\sqrt{\frac{a\tau}{2}}, \quad (J)$$

$$f_{MAX} = \frac{1}{2\pi\sqrt{L_1 C_1}} = \frac{47.8 \cdot 10^6}{l\sqrt{\varepsilon}\sqrt{\frac{d}{a}+\frac{1}{\varepsilon}}} \approx \frac{47.8 \cdot 10^6}{l\sqrt{\varepsilon}}\sqrt{\frac{a}{d}}\left(1-\frac{a}{2\varepsilon d}\right). \quad (K)$$

Comparison of formulas (J) and (K) shows that two targets covering resonator 1 significantly increase its resonant frequency $$\frac{f_{MAX}}{f_{MIN}} = \frac{\sqrt{2}}{\sqrt{\pi d + \frac{a\tau}{\varepsilon}}}. \quad (L)$$

Figure 10:
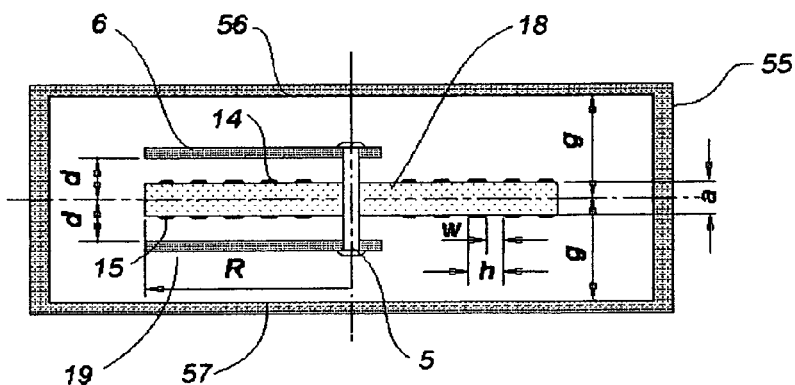
FIG. 10 illustrates the sensing element in an electrically conductive housing according to a preferred embodiment of the present invention.

According to one of the preferred versions of the present invention, sensing element 13 with targets 6 and 19 is placed into a metal case 55 (FIG. 10). This allows the exclusion of electromagnetic influence from external sources, and significantly stabilizes the reading. From a practical point of view, the height of case 55 (the distance between inside surfaces 56 and 57) should not be very large. At the same time, the electromagnetic field excited in the resonators concentrates near the resonators in a relatively thick layer, with a height exceeding R/π. This means that in the case of a relatively small height of case 55, the currents excited in metal surfaces 56, 57 will increase the minimum resonant frequency $f_{MIN}$ and decrease the sensitivity. However, this decrease can be small in comparison to the profit of the small height of case 55. This can be shown by replacing d with g in formulas (H), (I), and (K), where g is the distance between walls 47, 48 and the plane of symmetry. This gives, in the absence of targets 6 and 19, $$L_1 \approx L_2 \approx \mu_0 l \frac{g}{w}, \; C_1 \approx C_2 \approx \varepsilon_0 w l \left( \frac{\varepsilon}{a} + \frac{1}{g} \right), \quad (M)$$

and $$f_{MIN} = \frac{47.8 \cdot 10^6}{l \sqrt{\varepsilon} \sqrt{\frac{g}{a} + \frac{1}{\varepsilon}}} \approx \frac{47.8 \cdot 10^6}{l \sqrt{\varepsilon}} \sqrt{\frac{a}{g}} \left( 1 - \frac{a}{2\varepsilon g} \right). \quad (N)$$

In the presence of targets 6, 19, surfaces 56, 57 are shielded by targets 6, 19 and the maximum resonant frequency is defined as previously by formula (K). Comparing (K) and (N) gives $$\frac{f_{MAX}}{f_{MIN}} = \sqrt{\frac{\frac{g}{a} + \frac{1}{\varepsilon}}{\frac{d}{a} + \frac{1}{\varepsilon}}} \approx \sqrt{\frac{g}{d} \left( \frac{1 + \frac{a}{\varepsilon g}}{1 + \frac{a}{\varepsilon d}} \right)}. \quad (O)$$

It is seen from (O) that already when g is twice the value of d and a<<d, the ratio of frequencies is 1.41, which confirms the ability to obtain high sensitivity.

We claim:

1. An apparatus for measuring an angular position about a rotation axis, and related physical parameters, of a movable part, the apparatus comprising at least two electrodynamic targets, the electrodynamic targets being configured as segments having angular widths, the electrodynamic targets having an angular position in a rotation plane that is representative of the angular position of the movable part;
   in proximity to the electrodynamic targets, at least two resonators formed by plane slow-wave structures connected to at least one RF oscillator and a measuring circuit, further characterized in that:
   the resonators being formed by coupled slow-wave structures, each having an angular width, and placed parallel to the rotation plane,
   internal ends of the coupled slow-wave structures being connected to one another, their external ends forming terminals connected to the measuring circuit,
   at least two of the electrodynamic targets of approximately the same angular width being placed parallel to the resonators at approximately the same angular position as one another,
   the electrodynamic targets having a non-symmetrical configuration with respect to the rotation axis,
   the resonators having electrodynamic parameters, variation in the angular position of at least one of the electrodynamic targets resulting in variation in the electrodynamic parameters of at least one of the resonators,
   the measuring circuit converting changes in the electrodynamic parameters of the resonators into at least two informative signals,
   the measuring circuit comparing the informative signals and converting their difference into an electrical output indicative of the angular position of the target.

2. The apparatus of claim 1, at least two of the coupled slow-wave structures being formed by a dielectric plate having at least two plane regions, metallization being present in at least two plane regions of the dielectric plate.

3. The apparatus of claim 2, at least one of the electrodynamic targets being formed by at least one electrically conductive member.

4. The apparatus of claim 3, the electrically conductive member being formed by a metallization on a dielectric plate.

5. The apparatus of claims 1, 2, 3 or 4, the angular width of at least one of the targets being approximately equal to the angular width of at least one of the resonators.

6. The apparatus of claim 1, each of the resonators being formed by two radial spirals with approximately identical pitches and diameters but opposite directions of winding.

7. The apparatus of claim 6, the radial spirals having approximately constant pitch.

8. The apparatus of claim 6, the spirals having a plane of symmetry, the spirals being spaced one from the other by a gap, a, at least one of the electrodynamic targets moving in a rotation plane, the rotation plane being spaced from the plane of symmetry of the spirals by a distance, d, said gap, a, being less than the distance, d.

9. The apparatus of claim 6, the radial spirals forming the resonators having a configuration, the configuration being that of a segment or sector.

10. The apparatus of claim 1, resonant frequencies of the resonators being used as informative signals.

11. The apparatus of claim 1, impedances of the resonators being used as informative signals.

12. The apparatus of claim 1, two of the resonators being approximately identical to one another, each having an angular width of at least 90 degrees and not more than 180 degrees,
    the measuring circuit including a measuring bridge with at least first and second shoulders, in which the first shoulder is connected to one resonator and the second shoulder is connected to another resonator.

13. The apparatus of claim 12, at least two shoulders of the measuring bridge each including a rectifier, the rectifiers producing rectified signals,
    at least two of the rectified signals being compared and amplified by a differential amplifier, the output of the differential amplifier being indicative of the angular position of at least one of the electrodynamic targets.

14. The apparatus of claim 1, three of the resonators being approximately identical in shape and size, each of the three resonators having a resonator angular width of equal to, or less than, 120 degrees, the three resonators having approximately the same resonator angular width as one another, the three resonators being positioned approximately symmetrically with respect to one another and approximately parallel to the rotational plane, at least two of the electrodynamic targets, each electrodynamic target having a target angular width, the target angular width being approximately equal to the resonator angular width.

15. The apparatus of claim 14, the three resonators being excited by one RF oscillator through approximately identical resistors, the resonators each having at least two terminals and generating a signal at their respective terminals, the signals being compared to one another by the measuring circuit, the electrical output of the measuring circuit having a range, the range of electrical output of the measuring circuit being indicative of a range of angular position of more than 180 degrees.

16. The apparatus of claim 1, the resonators and electrodynamic targets being positioned, at least in part, within an electrically conductive housing.

17. The apparatus of claim 16, the housing having at least two approximately parallel walls, a distance g existing between at least one of the resonators and at least one wall of the housing, a distance d existing between at least one target and one resonator, the distance g exceeding the distance d by a factor of at least two.

\* \* \* \* \*